United States Patent [19]

Katoh et al.

[11] Patent Number: 5,125,141
[45] Date of Patent: Jun. 30, 1992

[54] WORK HOLDING APPARATUS

[75] Inventors: Tamotsu Katoh, Takahama; Takamichi Adachi, Kagamihara; Takeshi Kasahara, Aichi; Hitoshi Nakagawa, Nagoya; Yutaka Mishima, Toyota, all of Japan

[73] Assignee: Mitsubishi Jidosha Kogyo Kabushiki Kaisha, Tokyo, Japan

[21] Appl. No.: 670,171

[22] Filed: Mar. 14, 1991

Related U.S. Application Data

[63] Continuation-in-part of Ser. No. 359,359, May 31, 1989, abandoned.

[30] Foreign Application Priority Data

Jun. 10, 1988 [JP] Japan ................................. 63-141808

[51] Int. Cl.$^5$ .............................................. B23P 19/00
[52] U.S. Cl. ..................................... 29/33 P; 269/56; 269/57; 29/822
[58] Field of Search ............... 29/35.5, 33 K, 711, 29/721, 791, 33 P, 785, 38 C, 33 P, 33 J, 792, 48.5 R, 794, 822; 409/222, 224, 903, 25, 145, 158, 163, 162, 164, 189, 190, 191, 197, 219, 221, 225; 51/216 ND, 108 R; 408/49; 83/411.3; 264/56, 63, 65, 71

[56] References Cited

U.S. PATENT DOCUMENTS

| | | | |
|---|---|---|---|
| 2,481,383 | 9/1949 | Bickel et al. | 51/216 ND |
| 4,729,192 | 3/1988 | Eisdoerfer | 409/224 X |
| 4,767,046 | 8/1988 | Kumagai et al. | 29/33 P X |
| 4,984,351 | 1/1991 | Matsuyama et al. | 29/33 P X |

*Primary Examiner*—Larry Schwartz
*Assistant Examiner*—Robert Schultz
*Attorney, Agent, or Firm*—Abelman Frayne & Schwab

[57] ABSTRACT

A work holding apparatus is a work holder for holding a work in a predetermined position in relation to a basic member. A base column is rotatably supported astride on two sets of base plates. Holding fixtures are removably mounted on each side of the base column, such that different types of works can be supported and clamped by the holding fixtures. An indexing-rotation driving device rotates the base column such that it may be applicable to various types of works, thereby facilitating the holding of many types of works and the replacement of supporters and clamps. Furthermore, the base plate for supporting the base column is divided into two sets to reduce the weight of the base plate moving parts, and a base plate synchronizing means is provided to insure synchronized operation of the two base plates.

10 Claims, 4 Drawing Sheets

WORK HOLDING APPARATUS

This application is a continuation in part of U.S. Ser. No. 359,359 filed May 31, 1989, now abandoned.

FIELD OF THE INVENTION

The present invention relates to a work holding apparatus for holding a work in a specific position on a basic member of an automobile body under assembly.

BACKGROUND OF THE INVENTION

Side bodies, when welded to an underbody on an autobody assembly line, are supported and clamped by work holding fixtures and clamps in position in relation to the underbody that has been carried in on a carrier.

On the surface of the work holding apparatus are mounted many supporters for positioning a side body in a predetermined position and also many clamps for clamping the side body. The holding apparatus has a plurality of supporters at each positioning point so as to be applicable to various many types of side bodies, and is designed to project out only specific supporters to be used, by driving means such as hydraulic or pneumatic cylinders. The clamps are also mounted so as to be usable on a plurality of side bodies and selectively used.

When the shape of the side body is changed, the supporters that have been used will be withdrawn into the apparatus, and in turn, other supporters will be moved out to position and support the side body in a specific position.

Therefore, side bodies of different types can be supported on a single holding apparatus.

Techniques for holding autobody panels are known from Laid-Open Japanese Patent Application No. 57-158174 (Japanese Patent Application No. 56-44296 filed on Mar. 25, 1981), Laid-Open Japanese Utility Model Registration No. 61-131385 (Japanese Utility Model Registration No. 60-14734 filed on Feb. 6, 1985) and Laid-Open Japanese Patent Application No. 62-6879 (Japanese Patent Application No. 60-147345 filed on Jul. 3, 1985).

Japanese Patent Application No. 57-15817 discloses an autobody assembling method and equipment having, on each side of a polygonal rotating body, welding and positioning jigs selectable in accordance with the type of an automobile to be assembled.

Japanese Utility Model Registration No. 61-131385 discloses a parallel-production type automobile assembling apparatus equipped with a jig frame rotatably mounted to a movable body, and a jig base rotatably mounted on this jig frame.

Japanese Patent Application No. 62-6879 discloses an autobody assembly line equipped with rotatably mounted supporters having more than two body side clamping stations commonly usable for a plurality of vehicle models.

Since side bodies are changed with a change of a vehicle model, the supporters of the aforementioned holding apparatus, when used to hold a new type of side body, must be replaced with other types of supporters. In this case, it becomes necessary to make an accurate adjustment of all of the supporters if even one of the supporters has been replaced. In addition, as a plurality of supporters are provided at one point, each supporter having many supporting points, very many complicated pipelines and wires are required for the supporter driving source employed to move the supporters in and out. Therefore, the replacement of one type of supporters requires very many man-hours, and a prolonged shutdown of the assembly line. Further, since a readjustment of the accuracy of the supporters that have not been replaced is required, the supporters of the whole holding apparatus differ in mounting state between before and after the replacement.

SUMMARY OF THE INVENTION

It is an object of the present invention to provide a work holding apparatus which is capable of holding any one of a plurality of types of work. And which permits changing the holding fixtures for one type of work within a short period of time without adversly affecting the position of holding fixtures for other types of work.

The work holding apparatus of the present invention is designed to hold work in a predetermined position in relation to a basic member. It comprises a couple of base plates which are guided by guide members to reciprocate between a work loading position and a predetermined holding position in relation to the aforementioned basic member. A base plate synchronizing means is mounted on each base plate side, and drives each base plate to reciprocate. A base plate synchronizing means synchronizes the reciprocating motion of each base plate. A base column of a polygonal columnar shape has both ends rotatably supported on the center of the axis on each base plate. Work holding fixtures which are removably mounted on each side of the base column and supportingly clamp the above-mentioned work. An index-rotation driving device is mounted on the aforesaid base plate to rotate the base column for indexing. The work is held by the holding fixtures mounted on the surface of the base column. The two base plates are simultaneously moved along the guide member by the base plate driving means to hold the work in a predetermined position in relation to the base member. When the type of the work has been changed, the base column is rotated for indexing by the index driving device so as to properly position the work holding apparatus in a work holding position in relation to a new type of work. When the replacement of the holding fixture is needed, each of the fixtures on the side of the base column is changed separately.

DETAILED DESCRIPTION OF PREFERRED EMBODIMENT

A preferred embodiment of the present invention will now be particularly described with reference to FIGS. 1 and 2.

Figure 2:
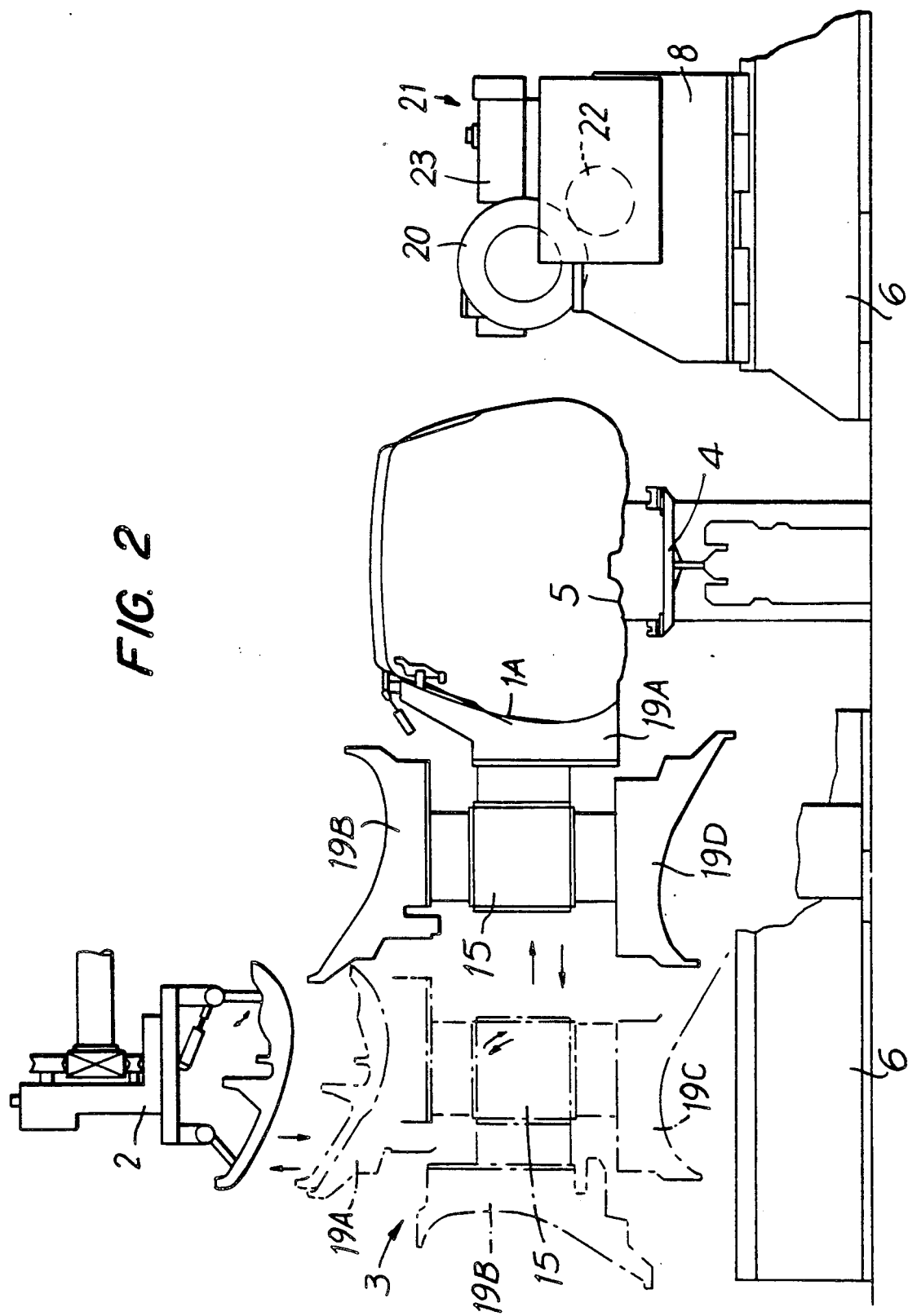
FIG. 2 is an explanatory view explaining the operating state of the work holding apparatus; and, FIGS. 3 and 4 are perspective views of a work holding apparatus according to alternative embodiments of the invention.

As shown in FIG. 2, a side body 1, is carried in on a carrier 2, and is fed to a work holding apparatus 3. The side body 1 is positioned by the work holding apparatus 3 in relation to an underbody 5 which is carried in on a carrier 4.

Figure 1:
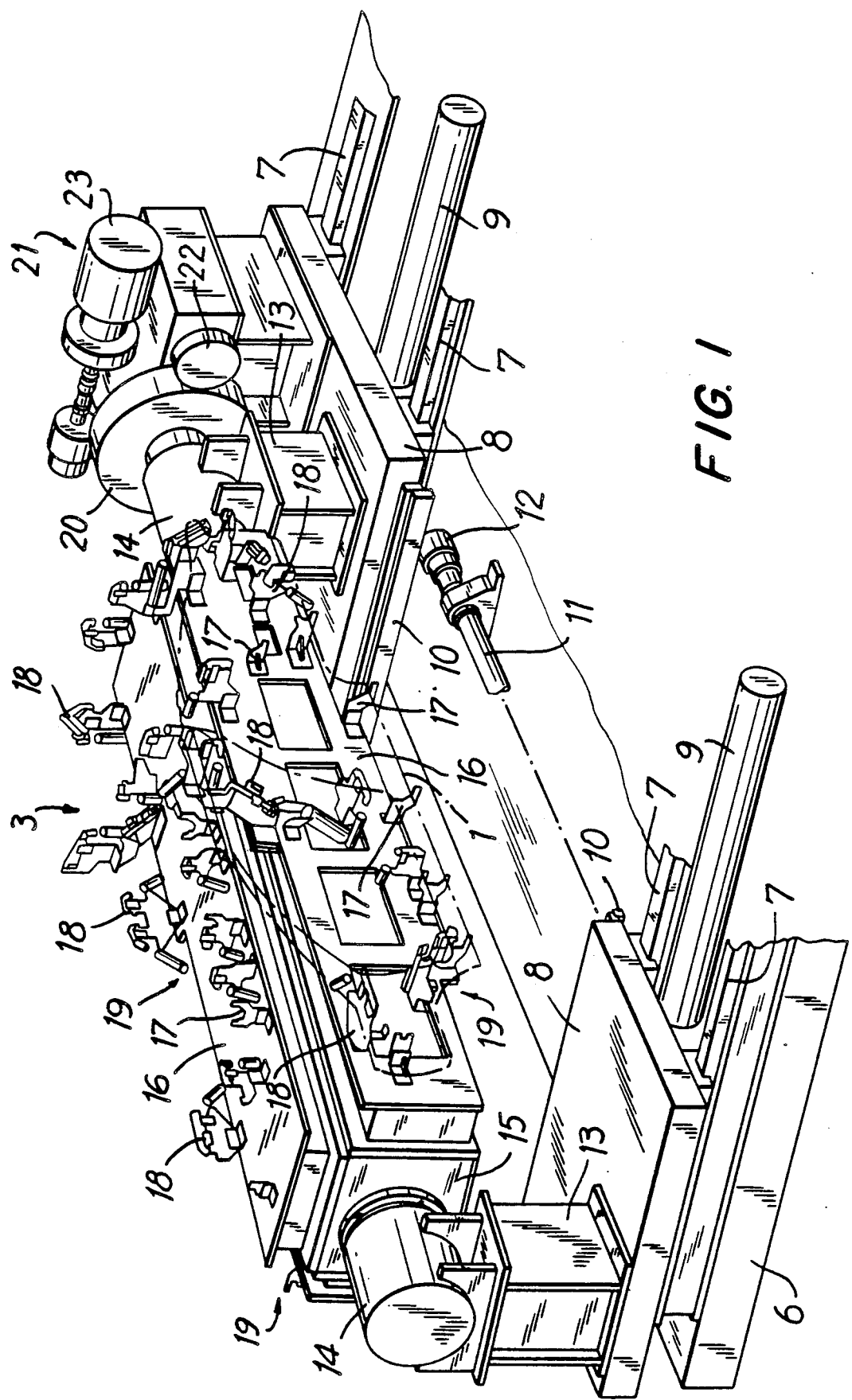
FIG. 1 is a perspective view of a work holding apparatus according to one embodiment of the present invention.

As shown in FIG. 1, the floor base 6 is equipped with two pairs of guide rails 7, respectively positioned at opposite sides of the carrier 2 and the sides of the underbody 5. On each pair of guide rails 7 is mounted a base plate 8 which is slidable longitudinally along the guide rails 7.

Figure 3:
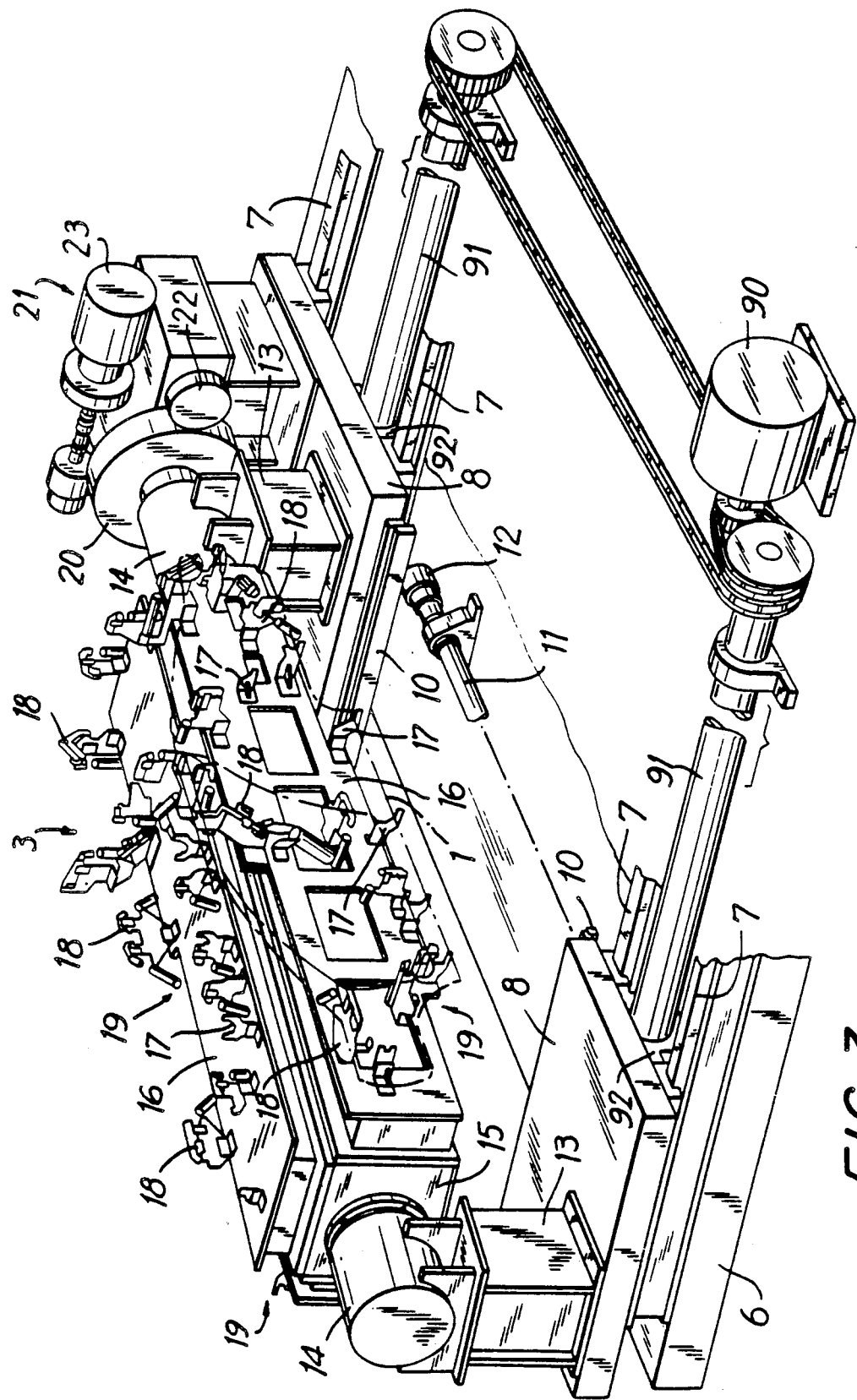
Figure 4:
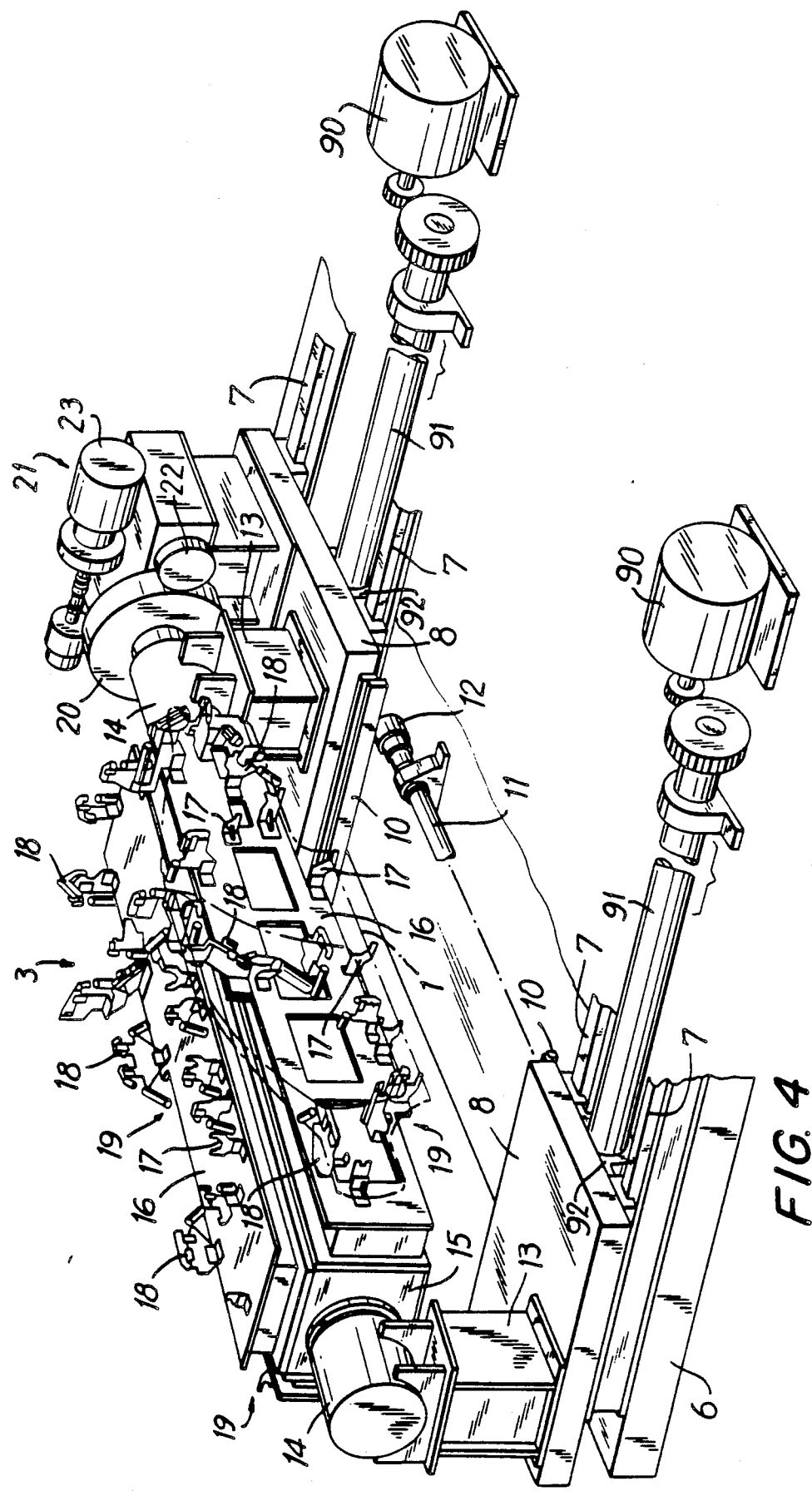

The base plates 8 are moved simultaneously by means of a fluid pressure cylinders 9 having a driving force related to the weight of the base plate 8. Since the base plate 8 is separated into two sections, the weight of each section can be reduced. Alternatively, and as illustrated in FIGS. 3 and 4, drive mechanisms comprising single or dual drive motors 90 providing a driving force corresponding to the weight of the base plate 8, feed screws 91 driven by the driving motor or motors, and feed nuts 92 in mesh With the feed screws fixed on the base plates 8, can be employed. In this case also, the weight of the feed screw, feed nut, etc. can be decreased.

Each base plate 8 has a rack 10 extending in the direction of movement. On the floor base 6 is rotatably supported a pinion shaft 11 having a center axis perpendicularly intersecting the guide rails 7. On both ends of the pinion shaft 11 are mounted pinions 12 which are in mesh with the racks 10. In this manner, the base plates 8 are moved simultaneously by the cylinders 9, the pinion shaft 11 with its pinions 12 in engagement with the racks 10 providing the synchronization.

On each base plate 8 is mounted a pedestal 13, in which a bearing 14 is housed. The bearings 14 rotatably support opposite ends of a square base column 15. The shape of the base column 15, however, is not limited to a square columnar shape.

On each side of the base column 15 is removably fixed a sub base 16 secured by bolts. On each sub base 16 are mounted a plurality of supporters 17 and clamps 18. The sub base 16 provided with these supporters 17 and clamps 18 makes a holding fixture 19. The supporters 17 and the clamps 18 on the respective sub bases 16 differ in the mounting position and condition, such that they each can be used for holding a specific kind of side body 1.

One end of the base column 15 carries a large-diameter gear 20. This large diameter gear 20 is in mesh with an output gear 22 of a rotation driving device 21. The rotation driving device 21 consists of a driving motor 23 and a speed reducer. The drive of the driving motor 23 is transmitted to an output gear 22, thus rotating the base column 15 for indexing through the intermediary of the large-diameter gear 20. The base column 15, after indexing, is locked in the index-rotation position by a locking means not illustrated.

Next, the operation of the work holding apparatus 3 of the above-mentioned constitution will be described. A work holding apparatus 3 is set on either side of the carrier 4. A work holding fixture 19A for a vehicle model A is equipped with supporters 17 and clamps 18 so arranged as to hold a side body 1A of the vehicle model A. Similarly, work holding fixtures 19B, 19C and 19D for vehicle models B, C and D are provided with supporters 17 and clamps 18 so arranged as to hold side bodies 1B, 1C and 1D of the vehicle models B, C and D respectively.

First, the holding of the side body 1A will be explained. As indicated by an alternate long and two short dashes line in FIG. 2, the base column 15 is rotated for indexing with the holding fixture 19A on the topside. Then, the carrier 2 lowers to unload a side body 1A onto the holding fixture 19A. The side body 1A thus unloaded is positioned by the supporters 17 of the holding fixture 19A and at the same time firmly locked by the clamps 18.

The drive of the driving motor 23 rotates the large-diameter gear 20 through the speed reducer and the output gear 22, rotating the base column 15 through 90 degrees clockwise in FIG. 2. Subsequently the base plates 8 are moved by the moving cylinders 9 towards the carrier 4 along the guide rails 7, thus positioning the side body 1A in a predetermined position in relation to the underbody 5 (in the position indicated by a full line in FIG. 2).

Movement of the base plates 8, causes the pinion shaft 11 to be rotated through the racks 10 and the pinions 12, therefore both the base plates 8 move simultaneously.

After the completion of welding, the work is unclamped from the clamps 18, and the base plates 8 are moved back toward the carrier 2 by the moving cylinders 9. The base column 15 is then driven by the driving motor 23 to rotate 90 degrees counterclockwise in FIG. 2, thus positioning the holding fixtures 19A on the top side. Hereafter the above-described operation will be repeated.

To hold the side body 1B, 1C or 1D, the driving motor 23 is operated to rotate the base column 15 until the holding fixtures 19B, 19C or 19D to be used come on the top side. Then, the similar work holding operations as the holding of the side body 1A will be carried out.

When a new type of side body 1 is to be assembled, for example when the shape of the side body 1A is changed, the holding fixture 19A is removed from the base column 15, and a new type of supporters 17 and clamps 18 corresponding to the new type of side body 1 are attached on the sub base 16 and their accuracy adjusted. After the installation and adjustment of the new type of supporters 17 and clamps 18, the holding fixture 19A is then fastened again to the base column 15.

Therefore, a new holding fixture 19A corresponding to new types of side bodies 1 can be prepared in a short period of time without in any way affecting to the supporters 17 and the clamps 18 of the holding fixtures 19B, 19C or 19D.

In consequence, the work holding apparatus is able to hold a plurality of types of works. Besides, the change of holding fixtures for one work can be performed in a short time without giving an effect to the holding fixtures for other types of works. Furthermore, lightweight moving parts are usable for moving the base column.

What is claimed is:

1. Apparatus for holding a workpiece in a predetermined position in relation to a basic member, comprising:

two base plates guided by guide members for reciprocation between a work loading position and a predetermined position in relation to said basic member;

a base plate driving member means mounted on each base plate;

base plate synchronizing means to synchronize the reciprocating motion of said base plates;

a base column of polygonal columnar shape and means detachably supporting said base column and means rotatably supporting said base column on said base plates;

a work holding fixture removably mounted on at least one side of said base column to supportingly clamp a workpiece; and, a driving device mounted on one of said base plates and connected to rotate said base column for indexing.

2. A work holding apparatus as claimed in claim 1, wherein said guide members each comprise two rails extending between said work loading position and said predetermined position.

3. A work holding apparatus as claimed in claim 1 wherein said base plate driving means is a fluid pressure cylinder which produces a driving force related to the weight of an associated said base plate.

4. A work holding apparatus as claimed in claim 1, wherein said base plate driving means comprises a driving motor which produces a driving force related to the weight of said base plates; a feed screw driven by said driving motor; and a feed nut in mesh with said feed screw and secured to a said base plate.

5. A work holding apparatus as claimed in claim 1, wherein said base plate synchronizing means comprise racks supported on said respective base plates, and a pinion shaft carrying a pinion gear on both ends thereof in mesh with a said respective rack.

6. A work holding apparatus as claimed in claim 1, wherein said holding fixture comprises a sub base removably mounted on each side of said base column; a plurality of work supporters mounted on each said sub base; and a plurality of work clamps mounted on each said sub base.

7. A work holding apparatus as claimed in claim 1, wherein said driving device comprises a large-diameter gear mounted on one end of said base column; a driving motor and a speed reducer mounted on said base plate on one end side; and an output gear of said speed reducer in mesh with said large-diameter gear.

8. A work holding apparatus as claimed in claim 2, wherein said base plate synchronizing means comprises a rack fastened on each said base plate, and a pinion shaft carrying pinion gears in mesh with said racks, and said holding fixture comprises sub bases removably mounted respectively on each side of said base column, a plurality of work supporters mounted on each of said sub bases; and a plurality of work clamps mounted on each of said sub bases.

9. A work holding apparatus as claimed in claim 2, wherein said base plate driving means is a fluid pressure cylinder which produces a driving force related to the weight of said base plate, said base plate synchronizing means comprise racks fastened on respective base plates, and a pinion shaft carrying pinion gears in mesh with respective racks; said holding fixtures comprise sub bases removably mounted respectively on each side of said base column, a plurality of work supporters mounted on said sub bases, and a plurality of work clamps mounted on said sub bases; and said index-rotation driving device comprises a large-diameter gear mounted on one end of said base column, a rotation driving motor and a speed reducer mounted on said base plate, and an output gear mounted, in mesh with said large-diameter gear, on the output side of said rotation a speed reducer.

10. A work holding apparatus as claimed in claim 2, wherein said base plate driving means comprises a driving motor which produces a driving force related to the weight of said base plates, a feed screw which is driven by said driving motor, and a feed nut which is in engagement with said feed screw and fastened on a side of said base plate; said base plate synchronizing means comprise racks fastened respectively on said base plates, and a pinion shaft carrying on both ends pinion gears in mesh with respective racks; said holding fixture comprises a sub base removably mounted on each side of said base column, a plurality of work supporters mounted on said sub base, and a plurality of work clamps mounted on said sub base; and said index-rotation driving device comprises a large-diameter gear mounted on one end of said base column, a rotation driving motor and a speed reducer mounted on said base plate one end side, and an output gear in mesh with said large-diameter gear mounted on the output side of said a speed reducer.

* * * * *